3,275,513
STABLE CALCIUM TETRACYCLINE COMPOSITIONS
Robert Arnold Nash, Spring Valley, and Joseph Francis Weidenheimer, New City, N.Y., assignors to American Cyanamid Company, Stamford, Conn., a corporation of Maine
No Drawing. Filed May 29, 1963, Ser. No. 283,973
12 Claims. (Cl. 167—65)

This invention relates to new and useful formulations of the tetracycline antibiotics, and more particularly, the invention is concerned with solutions adapted for certain pharmaceutical uses, of certain tetracycline antibiotics which are represented by the following general formula:

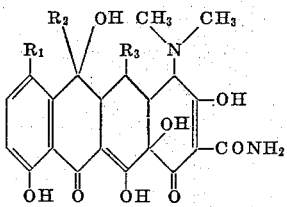

wherein the antibiotic is tetracycline when $R_1=H_1$, $R_2=CH_3$, $R_3=H$; chlortetracycline when $R_1=Cl$, $R_2=CH_3$ and $R_3=H$; dimethyltetracycline when $$R_1=R_2=R_3=H$$

and demethylchlortetracyline when $R_1=Cl$, $R_2=H$, and $R_3=H$. We have found that these four particular tetracyclines are stable in the solutions of the present invention. However, oxytetracycline (where $R_1=H$, $R_2=CH_3$ and $R_3=OH$ in the above formula) is not stable. Nevertheless, some tetracyclines which have not been tested may also be stable in these solutions while other may not. Stability of each particular tetracycline antibiotic is not predictable, and therefore must be determined by actual experimentation. The solutions of this invention show remarkable physical and chemical stability at an essentially neutral pH. They are comprised of a soluble calcium salt, and the tetracycline antibiotic dissolved in a polyhydric alcohol vehicle in the presence of large amounts of urea and may contain as much as 15 percent water without adversely effecting the stability of the tetracycline antibiotic. The solutions of this invention are preconstituted, that is they are prepared for pharmaecutical dispensing as solutions and do not have to be reconstituted prior to use.

It is well known that solutions of tetracyline anti-biotics are unstable in water and polyhydric alcohols. At an alkaline pH value, the corresponding isotetracylines are formed, in acidic media anhydrotetracylines are produced. At approximate neutrality epimerization results in the formation of 4-epitetracyclines. These various degradation products are generally inactive or only partially active. Hence formulations of these antibiotics in such simple solutions has not been practical. Because of instability problems, these antibiotics have been marketed heretofore as suspensions or in solid dosage forms such as powders, to be reconstituted with water prior to use. These dosage forms, although adequate, are sometimes quite inconvenient to prepare and also lack pharmacuetical elegance. Solutions of metallic complexes of these antibiotics in polyhydric alcohol vehicles have been suggested, but none of these has been satisfactory for oral or topical use because taste, pH and other physical factors have limited their pharmaceutical utility.

Solutions of the tetracyclines are considered to be truly stable both physically and chemically, when clear solutions are formed in therapeutic quantities, without any significant loss of potency and where the potency is not destroyed with age. In addition, the antibiotic should not precipitate from solution during prolonged storage at ambient temperatures.

We have found that solutions of physiologically acceptable polyhydric alcohols containging (a) the tetracycline antibiotic in therapeutic quantities; (b) a physiologically acceptable soluble source of calcium ion in molar ratio of substantially 2:1 calcium ion to tetracyline antibiotic; (c) quantities of urea in the range of about 15–25% weight/volume, produce physically and chemically stable solutions, at an essentially neutral pH value. If necessary the final solutions may be adjusted to a substantially neutral pH using glass and calomel electrodes as pH indicator.

It was surprising to find that epimerization or other degradations did not occur in any signficant quantities either initially or upon prolonged storage. At ambient temperatures the solutions of this invention remained both physically and chemically stable for more than a year at room temperature.

The essential difference between the solutions of the present invention and the unstable solutions of the prior art lies in the large amounts of urea which we employed to render the tetracycline solutions more stable. Urea is a common and widely used pharmaceutical adjuvant. For this reason it was used in the tetracycline systems herein described in small quantities and was found ineffective. However, when urea is used at concentrations of 15 to 25% weight per unit volume it not only renders the antibiotic stable but also imparts an elegance to the formulation. When used in oral preparations, for instance, it counteracts the unpleasant burning taste produced by the polyhydric alcohol diluents. When used in otic drops, in addition to its stabilizing effect, it promotes tissue healing.

Uniquely, only soluble calcium ions were found effective in this invention, such as calcium chloride, acetate, lactate, lactobionate, levulinate, ascorbate and other physiologically acceptable soluble calcium salts. Surprisingly soluble salts of other alkaline earth metal ions were not operable in this invention. Insoluble forms of calcium such as calcium hydroxide, sulfite, sulfate, gluconate, and citrate, etc. will not work. Concentrations of antibiotic in the range of about 5 to 125 mg./ml. remain both physically and chemically stable in the solutions of this invention. About 25 mg. of the antibiotic per milliliter is the preferred concentration for oral administration. The concentration of urea for oral use is preferred in the upper limits of the critical range, that is about 25% w./v. In otic preparations about 15% urea is sufficient for stability.

The polyhydric alcohols which are especially satisfactory in this invention are propylene glycol, glycerol and the liquid polyethylene glycols, although other physiologically acceptable polyhydric alcohols may also be considered.

In order to insure the stability of the solutions of this invention, it is often necessary to adjust the pH to between 6.5 to 7.5 with a suitable physiologically acceptable base. An organic base such as monoethanolamine or triethanolamine is preferred. However, if the pH of the solution is found to be substantially neutral, further adjustment is not required. In order to prevent oxidative degradation which is common in solutions of the tetracyclines (discoloration and some loss of potency), a suitable antioxidant is added to the preparation, such as sodium bisulfite, monothioglycerol and other physiologically acceptable antioxidants or combinations thereof. Generally, less than 0.5% of the antioxidant is employed, and oxidizing conditions are avoided during preparation and storage.

The novel compositions of the present invention are prepared by dissolving the soluble calcium salt and urea with the calculated quantity of base, if necessary, to adjust the pH, in a portion of the polyhydric alcohol. Sometimes heat is required to facilitate solution. The antibiotic is added preferably in the amphoteric form, but can also be added as the acid addition salt. The volume is finally adjusted with additional solvent to the desired concentration of the antibiotic. Distilled water up to 15%, flavors, adjuvants, and other compatible medicaments may be added before the solution is brought to final volume. The addition of commercial pharmaceutical adjuvants such as benzocaine, sodium cyclohexylsulfamate, flavoring agents, adrenocorticoids, vitamins, etc. did not adversely affect the stability of these solutions.

This invention makes possible solutions which are chemically and physically stable, clear, elegant, and generally useful in pharmaceutical preparations such as oral syrups, otic preparations and pediatric drops.

The following examples are provided as specific illustrations and are not to be construed as limiting the invention.

Example 1

To about 50 ml. of warm propylene glycol (about 60° C.) was dissolved 1.53 g. of calcium chloride dihydrate and 25 g. of urea. The solution was cooled to room temperature before adding 1.0 g. of sodium bisulfite followed by 2.65 g. (slight excess) of tetracycline neutral. A few drops of triethanolamine were added and the solution was made up to 100 ml. with propylene glycol. The pH as determined by glass and calomel electrodes was 7.0. The initial concentration of the solution assayed 25.5 mg./ml. tetracycline content as the hydrochloride.

A second solution was prepared as above but without urea. The initial assay of this solution showed a potency of 24.8 mg./ml. tetracycline as the hydrochloride, and a pH value of 6.9.

Samples of the above solutions were subjected to stability study, the results of which are indicated in Table I.

TABLE I.—TETRACYCLINE ACTIVITY IN MG./ML. AS THE HYDROCHLORIDE

| Initial Assay | Room Temperature (2 months) | 42° C. (2 months) |
|---|---|---|
| 25% Urea: 25.5 | 25.5 | 26.0 |
| No Urea: 24.8 | 16.0 | 18.5 |

The unstable preparation without urea was discarded. The formulation with urea remained stable at room temperature for over a year. (Assay—25.2 mg./ml. tetracycline as hydrochloride.) The solution also remained clear and the color unchanged.

Example 2

Samples were prepared as in Example 1, with and without urea, at a concentration of 50 mg./ml. tetracycline as the hydrochloride, and each was adjusted to pH 6.5 and 7.5 with monoethanolamine and subjected to autoclave stability study; results are shown in Table II. The solutions in both cases assayed 52 mg./ml. tetracycline as the hydrochloride.

TABLE II.—AUTOCLAVE STABILITY OF FORMULATIONS WITH AND WITHOUT UREA TETRACYCLINE ACTIVITY IN MG./ML. AS THE HYDROCHLORIDE

| pH | | Mg./ml., 1 hr. | Mg./ml., 2 hrs. |
|---|---|---|---|
| 6.5 | 25% urea | 52.0 | 53.0 |
|  | No urea | 32.5 | 29.0 |
| 7.5 | 25% urea | 52.0 | 50.5 |
|  | No urea | 46.0 | 39.0 |

Example 3

Formulations were prepared as in Example 1 using molar equivalents of either demethyltetracycline or chlortetracycline in place of the tetracycline. The resulting clear solutions were subjected to stability tests as indicated in Table III. The pH value was 7 in each case.

TABLE III.—STABILITY OF OTHER TETRACYCLINES IN ESSENTIALLY NEUTRAL PROPYLENE GLYCOL SOLUTIONS

| System | Theory | Initial | Microbio assay mg./ml. as the Hydrochloride— room temperature | | |
|---|---|---|---|---|---|
|  |  |  | 2 mon. | 6 mon. | 12 mon. |
| DMTC-Ca$^{II}$(1:2): |  |  |  |  |  |
| 25% urea | 25.0 | 23.2 | 23.6 | 21.4 | -------- |
| No urea | 25.0 | 18.1 | 17.6 | 14.8 | -------- |
| CTC-Ca$^{II}$(1:2): |  |  |  |  |  |
| 25% urea | 25.0 | 25.1 | 25.3 | 29.9 | 23.0 |
| No urea | 25.0 | 25.6 | 17.2 | 17.8 | 12.0 |

Example 4

An oral pharmaceutical syrup was prepared as described in Example 1, containing the following ingredients:

|  | G. |
|---|---|
| Tetracycline neutral | *2.83 |
| Calcium cyclohexylsulfamate | 4.04 |
| Urea U.S.P. | 25.0 |
| Sodium bisulfite reagent | 0.1 |
| Distilled water | 7.0 |
| Triethanolamine | 1.6 |
| Red fruit mint flavor | 0.2 |
| Glycerol U.S.P., q.s. ad 100.0 ml. |  |

*Equivalent to 2.5 gm. tetracycline hydrochloride.

This clear oral preparation having a pH of 7.0 was tested for stability at room temperature for one year. The following table shows the results:

TABLE IV

| | Tetracycline activity as the hydrochloride, mg./ml. |
|---|---|
| Theory | 25.0 |
| Initial | 26.5 |
| 1 month at room temperature | 26.1 |
| 5 months at room temperature | 24.6 |
| 8 months at room temperature | 25.4 |
| 12 months at room temperature | 24.5 |

Example 5

An otic drop formulation of tetracycline was prepared by the procedure in Example 1, containing the following ingredients.

|  | G. |
|---|---|
| Tetracycline hydrochloride | 0.55 |
| Benzocaine | 5.0 |
| Urea U.S.P. | 15.0 |
| Calcium lactate | 0.513 |
| Sodium bisulfite | 0.1 |
| Distilled water | 0.5 |
| Triethanolamine | 0.36 |
| Propylene glycol, q.s. ad 100.0 ml. |  |

The preparation had a pH value of 7 and was tested for stability at room temperature for one year and at 42° C. for 2 months. The results are shown in Table V.

TABLE V

| | Tetracycline activity as the hydrochloride, mg./ml. |
|---|---|
| Initial | 5.36 |
| 42° C.—2 month | 5.46 |

| | |
|---|---|
| Room temperature—2 months | 5.14 |
| Room temperature—4 months | 5.26 |
| Room temperature—6 months | 5.02 |
| Room temperature—12 months | 4.94 |

Example 6

An otic drop formulation was prepared by the procedure of Example 1, using demethyltetracycline and containing the following ingredients:

| | G. |
|---|---|
| Demethyltetracycline hydrochloride | 0.55 |
| Benzocaine | 5.0 |
| Urea U.S.P. | 15.0 |
| Calcium lactate | 0.516 |
| Sodium bisulfite | 0.1 |
| Distilled water | 0.5 |
| Triethanolamine | 0.33 |
| Propylene glycol, q.s. ad 100.0 ml. | |

The preparation had a pH value of 7 and was tested for stability at room temperature for one year, and at 42° C. for 2 months. The results were as follows:

TABLE VI

| | Tetracycline activity as the hydrochloride, mg./ml. |
|---|---|
| Initial | 5.19 |
| 42° C.—2 months | 4.76 |
| Room temperature—2 months | 5.05 |
| Room temperature—4 months | 4.94 |
| Room temperature—6 months | 5.02 |
| Room temperature—12 months | 5.11 |

Example 7

An otic drop preparation was prepared by the procedure of Example 1 using demethylchlortetracycline and containing the following ingredients:

| | G. |
|---|---|
| Demethylchlortetracycline hydrochloride | 0.525 |
| Triamcinolone acetonide | 0.105 |
| Benzocaine | 5.0 |
| Urea U.S.P. | 15.0 |
| Calcium lactate | 0.457 |
| Sodium bisulfite | 0.2 |
| Distilled water | 0.5 |
| Triethanolamine | 0.36 |
| Propylene glycol, q.s. ad 100.0 ml. | |

Stability studies were conducted at room temperature, and at 42° C. for 2 months. The results are as follows:

TABLE VII

| | Tetracycline activity as the hydrochloride, mg./ml. |
|---|---|
| Initial | 5.02 |
| 42° C.—2 months | 5.54 |
| Room temperature—2 months | 4.98 |
| Room temperature—4 months | 4.72 |
| Room temperature—6 months | 5.11 |

Having thus described our invention we claim:

1. A preconstituted clear, physically and chemically stable, essentially neutral solution consisting of a tetracycline antibiotic represented by the general formula:

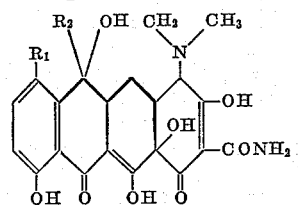

wherein $R_1$ is selected from the group consisting of hydrogen and chlorine and $R_2$ is selected from the group consisting of hydrogen and methyl, comprising from about 5 to about 125 mg. per ml. of the tetracycline antibiotic, substantially two molar equivalents of a physiologically acceptable soluble calcium salt per mole of antibiotic, about 15 to 25 percent w./v. of urea, in a physiologically acceptable polyhydric alcohol vehicle, at a substantially neutral p.H.

2. A solution, as in claim 1, wherein the polyhydric alcohol vehicle is propylene glycol.

3. A solution, as in claim 1, wherein the polyhydric alcohol vehicle is glycerol.

4. A solution, as in claim 1, wherein the calcium salt is calcium cyclohexylsulfamate.

5. A solution, as in claim 1, wherein the calcium salt is calcium lactate.

6. A solution, as in claim 1, wherein the calcium salt is calcium chloride.

7. A solution, as in claim 1, wherein triethanolamine is added to adjust the pH between 6.5–7.5.

8. A solution, as in claim 1, suitable for oral administration, wherein the concentration of urea is 25 percent w./v., and the concentration of the tetracycline antibiotic is 25 to 125 mg./ml. as the hydrochloride.

9. A solution, as in claim 1, suitable for otic use, wherein the concentration of urea is 15 percent w./v., and the concentration of the tetracycline antibiotic is 5 mg./ml. as the hydrochloride.

10. A solution, as in claim 9, wherein the tetracycline is demethylchlortetracycline.

11. A solution, as in claim 9, wherein the tetracycline is demethyltetracycline.

12. A solution, as in claim 9, wherein the tetracycline is chlortetracycline.

References Cited by the Examiner

UNITED STATES PATENTS

| | | | |
|---|---|---|---|
| 3,005,754 | 10/1961 | Granatek | 167—65 |
| 3,009,956 | 11/1961 | Noseworthy | 260—559 |
| 3,017,323 | 1/1962 | Gordon et al. | 167—65 |
| 3,026,248 | 3/1962 | Noseworthy et al. | 167—65 |
| 3,132,993 | 5/1964 | Granatek | 167—65 |
| 3,155,587 | 11/1964 | Reed et al. | 167—65 |

OTHER REFERENCES

Chem. Abstracts, 54: p. 14589h (1960).

Chem. Abxtracts, 56: 2858bc (Feb. 5, 1962).

Martindale, "The Extra Pharmacopoeia," 24th Edition, vol. 1, pp. 1336–1337, entry "Urea" published 1958 by the Pharmaceutical Press, London, England.

Smith et al., "Tetracycline-Urea Compound," J. Org. Chem., 23: 721–4 (1958).

"The Merck Index of Chemicals and Drugs," 7th Ed., published 1960 by Merck & Co., Rahway, N.J., pp. 190–199 (calcium Salts); 213 (Carbowax); 250–251 (chlortetra-cycline); 308 (cyclamate calcium); 322 (Declomycin); 420 (ethanolamine); 423 (ethyl aminobenzoate); 460 (formaldehyde sodium sulfoxylate); 489 (glycerol); 765–766 (oxytetracycline); 863 (propylene glycol); 946 (sodium bisulfite); 1021 (tetracycline); 1037 (monothioglycerol); 1057 (triamcinolone acetonide); 1063 (triethanolamine); 1082 (urea) "U.S.D." (25th) "Dispensatory of the United States of America," 25th Ed. Part 1, pp. 1475–1477, entry "Urea," published 1955, by J. B. Lippincott Co.

LEWIS GOTTS, Primary Examiner.

SHEP K. ROSE, Assistant Examiner.